US008422598B2

United States Patent
Othman et al.

(10) Patent No.: US 8,422,598 B2
(45) Date of Patent: Apr. 16, 2013

(54) METHOD FOR DECODING A SIGNAL TRANSMITTED IN A MULTI-ANTENNA SYSTEM, CORRESPONDING COMPUTER SOFTWARE PRODUCT AND DECODING DEVICE

(75) Inventors: Ghaya Rekaya-Ben Othman, Antony (FR); Jean-Claude Belfiore, Paris (FR); Rym Ouertani, Tunis (TN)

(73) Assignee: Institut Telecom / Telecom Paristech, Paris Cedex (FR)

( * ) Notice: Subject to any disclaimer, the term of this patent is extended or adjusted under 35 U.S.C. 154(b) by 74 days.

(21) Appl. No.: 12/866,183

(22) PCT Filed: Feb. 2, 2009

(86) PCT No.: PCT/EP2009/051141
§ 371 (c)(1),
(2), (4) Date: Nov. 23, 2010

(87) PCT Pub. No.: WO2009/098178
PCT Pub. Date: Aug. 13, 2009

(65) Prior Publication Data
US 2011/0058617 A1 Mar. 10, 2011

(30) Foreign Application Priority Data

Feb. 4, 2008 (FR) ..................... 08 50690

(51) Int. Cl.
*H03D 1/00* (2006.01)
*H04L 27/06* (2006.01)
(52) U.S. Cl.
USPC ........... 375/340; 375/260; 375/262; 375/267; 375/324; 370/208
(58) Field of Classification Search ................... 375/260, 375/262, 267, 324, 340, 341; 370/203–211
See application file for complete search history.

(56) References Cited

U.S. PATENT DOCUMENTS

| 8,094,744 B1 * | 1/2012 | Song et al. ..................... 375/267 |
| 2006/0018410 A1 * | 1/2006 | Onggosanusi et al. ....... 375/340 |
| 2007/0105595 A1 * | 5/2007 | Prasad et al. ............... 455/562.1 |

FOREIGN PATENT DOCUMENTS

WO 2007087540 A2 8/2007

OTHER PUBLICATIONS

French Search Report dated Dec. 12, 2008 for corresponding French Application No. 0850690, filed Feb. 4, 2008.
Andy Lau et al., "A Sequential Soft-Decision Decoder for Reed-Solomon Codes Applied to Encoded PSK in Rayleigh-Faded Channels" Feb. 1, 1996.
Fu-Quan Wang et al., "A Hybrid M-Algorith/Sequential Decoder for Convolutional and Trellis Codes" Jun. 29, 1990.
Asenstorfer J. et al., "A Hybrid Sequential-Viterbi Decoder" Jan. 1, 1986.
International Search Report and Written Opinion dated Mar. 6, 2009 for corresponding International Application No. PCT/EP2009/051141, filed Feb. 2, 2009.
International Preliminary Report on Patentability for corresponding International Application No. PCT/EP2009/051141, filed Feb. 2, 2009.

* cited by examiner

*Primary Examiner* — Curtis Odom
(74) *Attorney, Agent, or Firm* — David D. Brush; Westman, Champlin & Kelly, P.A.

(57) ABSTRACT

A method is provided for decoding a signal received by a receiver including at least one reception antenna. The method includes: selecting, among at least two techniques available in the receiver, a decoding technique representative of a space/time encoding implemented upon transmission; and decoding the signal using the selected decoding technique. The selecting step takes into account at least one selection criterion.

9 Claims, 4 Drawing Sheets

METHOD FOR DECODING A SIGNAL TRANSMITTED IN A MULTI-ANTENNA SYSTEM, CORRESPONDING COMPUTER SOFTWARE PRODUCT AND DECODING DEVICE

CROSS-REFERENCE TO RELATED APPLICATIONS

This Application is a Section 371 National Stage Application of International Application No. PCT/EP2009/051141, filed Feb. 2, 2009 and published as WO 2009/098178 on Aug. 13, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of wireless communications. More specifically, the disclosure pertains to the reception of signals in the context of MIMO (Multiple-Input Multiple-Output) systems implementing one or more receiver antennas.

The disclosure can be applied especially in the field of mobile radio communications.

BACKGROUND OF THE DISCLOSURE

The techniques of transmission in systems comprising multiple antennas have many advantages.

In particular, these techniques make it possible to attain an increased transmission capacity by augmenting the spectral efficiency in the transmission channel through the use of space/time codes at sending. These space/time codes can be used especially to distribute the modulated symbols on the different degrees of freedom of the channel.

FIG. 1 provides a more precise illustration of a transmission scheme in a multi-antenna system.

On the sending side, a binary source signal 10 to be sent undergoes a source encoding 11 and then a channel encoding 12. It then goes through a modulation module 13 designed to convert binary elements into complex symbols: such a module thus associates a complex signal, belonging to a constellation (of the QAM type for example), with a group of bits. Then, a space/time encoding 14 of each group of K symbols is performed and these symbols are then sent on $n_t$ sending antennas $15_1$ to $15n_t$ in a MIMO type transmission context.

The signal is then conveyed through a transmission channel and then received on the $n_r$ receiver antennas $16_1$ to $16n_r$. Each receiver antenna receives a linear combination of the symbols sent on each of the $n_t$ sending antennas. The signal received is first of all decoded in a space/time decoding module 17 applying a processing operation corresponding to a reverse of the space/time encoding applied when sending.

The equalized signal at output of the space/time decoding block 17 is then fed into a demodulation module 18 and undergoes operations of channel decoding 19 and source decoding 20, delivering an estimated binary signal.

Unfortunately, owing to the use of several antennas, the decoding of the received signals is particularly complex.

Indeed, in order to obtain high decoding performance, it is necessary to use an optimal decoding technique, in terms of maximum likelihood decoding in the decoding module 17, for example sphere decoding or Schnorr-Euchner algorithm decoding.

Now, the complexity of these techniques greatly increases depending on the number of antennas and the number of modulation states.

Some techniques set up a time-out mechanism to limit the time taken to decode a given block and declare a block erasure. A specific block retrieval algorithm is then implemented and another decoder is used to replace the defective decoder.

The principle consists in stopping a decoder after a certain degree of complexity and finishing the decoding by another method. This is not an adaptive decoding because the decoder is fixed at the outset, and the stop criterion that may depend on the channel is used subsequently and not initially in order to choose the decoder.

There is therefore a need for a novel, less complex technique for receiving signals in systems implementing several sending and/or receiving antennas.

SUMMARY

An embodiment of the present invention relates to a method for decoding a signal sent by a sender through a transmission channel and received by a receiver comprising one or more receiving antennas.

According to an embodiment of the invention, such a method comprises:

a step for selecting, among at least two techniques available in said receiver, a technique of decoding representative of space/time encoding at sending, said step for selecting taking account of at least one selection criterion;

a step for decoding said signal implementing the selected decoding technique.

Thus, an embodiment of the invention relies on novel and inventive approach to the decoding of a signal received in a multi-antenna system, enabling the selection of a technique of decoding among several techniques available at the receiver.

The decoding technique selected is representative of a space/time encoding implemented in sending mode. In other words, it is a space/time decoding technique.

Thus, it is possible to adapt the decoding technique to the situation; in taking account for example of the quality of the transmission channel or of the specifications of the multi-antenna system.

In particular, the selection and decoding steps are applied adaptively, periodically and/or as a function of a variation of the transmission channel.

Thus, the decoding technique used can be changed during transmission, periodically and/or as a function of a variation of the transmission channel.

The adaptive scheme proposed by an embodiment of the invention also provides for a less complex decoding scheme. The adaptive scheme proposed by an embodiment of the invention also presents another advantage. Indeed, this scheme gives a mean decoding complexity that is constant for different signal-to-noise ratios and also for different embodiments of the channel. This is not the case for the other schemes where the complexity depends on the signal-to-noise ratio.

In particular, it is sought to optimize the performance or complexity of decoding or achieve a compromise between these two variables throughout the transmission time.

According to one particular aspect of an embodiment of the invention, the available decoding techniques comprise at least one optimal decoding technique in terms of maximum likelihood (ML) decoding and at least one sub-optimal decoding technique.

The term "sub-optimal decoding technique" is understood to mean especially a decoding technique that does not give the performance of an ML type technique. Such a sub-optimal decoding technique is therefore less complex and requires fewer resources than an optimal technique.

For example, the decoding techniques belong to the group comprising:

a "Zero-Forcing" (ZF) linear decoding technique;

a "Minimum Mean Square Error" (MMSE) linear decoding technique;

a "Zero-Forcing—Decision Feedback Equalization" (ZF-DFE) decoding technique;

a "Minimum Mean Square Error—Decision Feedback Equalization" (MMSE-DFE) decoding technique;

a sphere decoding technique;

a decoding technique based on the Schnorr-Euchner algorithm;

a Fano sequential decoding technique or any modified form of this technique;

a sequential stack decoder technique or any modified form of this technique.

Other decoding techniques may also be used.

Thus, it is possible in this aspect of an embodiment of the invention to select an optimal decoding technique or a sub-optimal decoding technique in taking account of at least one criterion of selection such as the quality of the transmission channel or the specifications of the multi-antenna system.

According to a first example, at least one selection criterion takes account of a probability of outage in the transmission channel.

More specifically, this outage probability corresponds to the probability that the instantaneous capacity of the transmission channel is smaller than or equal to the transmission rate, where the transmission rate corresponds to the number of bits transmitted (i.e. the spectral efficacy in bits) per channel use.

This selection channel criterion therefore takes account of the conditions of the transmission channel.

For example, this selection step is deemed to select a sub-optimal decoding technique when the instantaneous capacity of the transmission channel is lower than the transmission rate in terms of bits per channel use, and to select an optimal decoding technique when the instantaneous capacity of the transmission channel is greater than or equal to the transmission rate, in terms of bits per channel use.

Thus, if the transmission channel is of high quality, it is possible to select a decoding technique optimal in terms of maximum likelihood decoding, having high performance in terms of error rate. If the quality of the transmission channel deteriorates during transmission, then the decoding technique can be adapted by selecting a sub-optimal decoding technique having lower performance in terms of error rate but reduced complexity in terms of mathematical operations. Then, a return to an optimal decoding technique is possible when the quality of the transmission channel improves.

Naturally, various optimal decoding techniques can be applied during one and the same transmission, for example using sphere decoding, the Schnorr-Euchner algorithm, sequential Fano decoding, sequential stack decoding or any modified form of the stack decoder etc.

Similarly, various sub-optimal techniques can be applied during a same transmission such as ZF linear decoding or MMSE, ZF-DFE decision feedback decoding or MMSE-DFE decision feedback decoding, or sequential decoding with a bias b different from 0 etc.

In particular, the sequential decoders can apply a technique of optimal decoding when they show a bias b equal to 0 or a sub-optimal decoding technique when they show a bias b different from 0. In other words, the stack decoder or any modified form of this decoder has performance characteristics ranging from those of a ZF-DFE decoder to those of a decoder in the maximum-likelihood sense. Such decoders are described especially by A. D. Murugan, H. El Gamal, M. O. Damen and G. Caire in "*A Unified Framework for Tree Search Decoding: Rediscovering the Sequential Decoder*", 13 May 2005.

Consequently, by modifying only the parameter b of such a decoder i.e. without adding complementary hardware resources in implementing the receiver, it is possible to apply both an optimal decoding technique and a sub-optimal decoding technique.

In a second example, at least one selection criterion takes account of at least one target error rate as a function of a signal-to-noise ratio.

This selection criterion therefore takes account of the specifications of the transmission system.

More specifically, this second example entails defining a maximum error rate (target error rate) that must be complied with for different signal-to-noise ratios. It is possible to define a single target error rate $Pe_{target}$ to be complied with for all the signal-to-noise ratios or else different target error rates $Pe_{target}$ each corresponding to a signal-to-noise ratio or to a range of signal-to-noise ratios.

It is then possible to pre-select one or more decoding techniques for complying with this target error rate or these target error rates.

In particular, if several decoding techniques are used to achieve this or these target error rates, the selection step can select the decoding technique having the lowest error rate among the pre-selected techniques. According to another variant, the selection step can select the decoding technique with the lowest complexity among the pre-selected techniques.

In a third example, the selection step takes account of several selection criteria. For example, it takes account of both the conditions of transmission and the specifications of the transmission system.

In this example, the decoding method implements a first selection criterion taking account of at least one target error rate as a function of a signal-to-noise ratio so as to define at least two ranges of signal-to-noise ratios and, for each of said ranges, a second criterion of selection taking account of a probability of outage in the channel in said range.

In other words, several target error rates $Pe_{target}$ to be complied with are defined for different ranges of signal-to-noise ratio as described here above with reference to the second example. For example, a target error rate of 1 is defined for a signal-to-noise ratio ranging from 0 to 15, a target error rate of 0.1 is defined for a signal-to-noise ratio ranging from 15 to 20 and a target error rate of 0.01 is defined for a signal-to-noise ratio greater than 20.

Then, for each signal-to-noise ratio range, the second selection criterion is applied, taking account of a probability of outage of the channel in the range, as defined here above with reference to the first example.

Another aspect of an embodiment of the invention pertains to a computer software product downloadable from a communications network and/or recorded on a computer-readable carrier and/or executable by a processor, comprising program code instructions for implementing the decoding method described here above.

In another embodiment, the invention pertains to a device for decoding a signal sent by a sender through a transmission channel and received by a receiver comprising one or more receiving antennas.

Such a device comprises:

means for selecting, among at least two techniques available in said receiver, a technique of decoding representative of a space/time encoding implemented at sending, said means for selecting taking account of at least one selection criterion;

means for decoding said signal implementing the selected decoding technique.

Such a decoding device is suited especially to applying the above-decoding technique. It can be integrated into a receiver of a MIMO system comprising one or more receiving antennas.

This device could of course comprise the different characteristics pertaining to the decoding method of the invention.

BRIEF DESCRIPTION OF THE DRAWINGS

Other features and advantages of embodiments of the invention shall appear from the following description of a particular embodiment, given by way of an illustrative and non-exhaustive example and from the appended drawings, of which.

DETAILED DESCRIPTION OF ILLUSTRATIVE EMBODIMENTS

1. General Principle

The general principle of an embodiment of the invention relies on the selection of a space/time decoding technique from among several available techniques, in a receiver, enabling especially the best possible adaptation to the application considered, in the case of a MIMO transmission.

In particular, an embodiment of the invention can be used to select an optimal decoding technique in terms of maximum likelihood (ML) decoding or a sub-optimal technique, i.e. one that does not allow ML performance to be attained, in taking account of at least one selection criterion.

It may be recalled especially that the sub-optimal decoding techniques of the ZF, MMSE, ZF-DFE, MMSE-DFE and other types have low complexity but show mediocre performance.

On the contrary, the optimal decoding techniques such as sphere decoders, decoders based on the Schnorr-Euchner algorithm, Fano decoders, stack decoders, etc, attain ML performances but at the cost of great complexity which increases with the number of antennas of the transmission system.

Thus, according to an embodiment of the invention, the decoding technique can be adapted to the situation, and the decoding technique selected during transmission can be changed in order to use the best suited technique.

Figure 2:
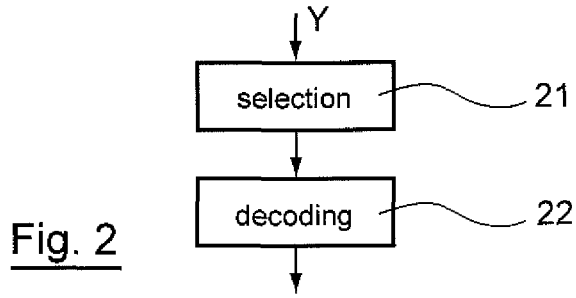
FIG. 2 illustrates the main steps of the decoding method according to an embodiment of the invention.

FIG. 2 illustrates the main steps of the method for decoding a signal received by a receiver comprising one or more receiving antennas according to an embodiment of the invention.

Figure 1:
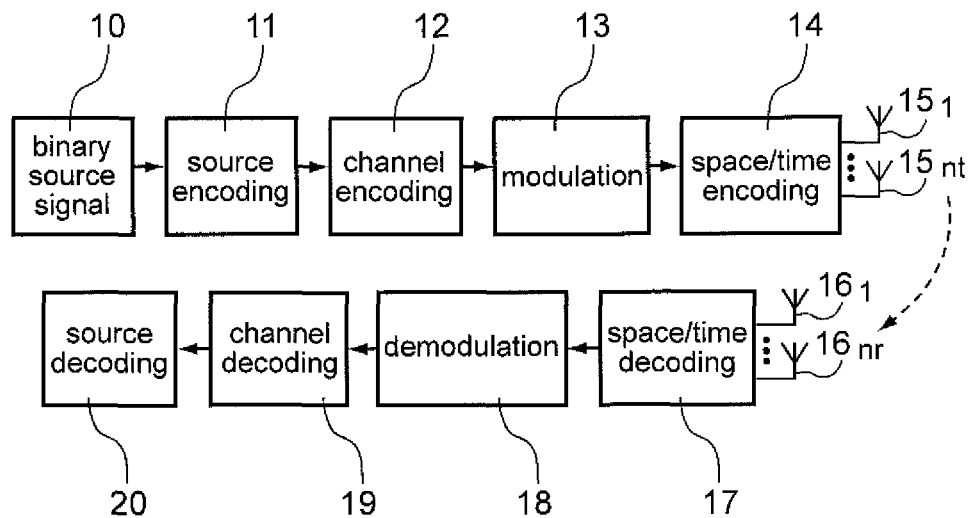
FIG. 1 already commented upon with reference to the prior art presents a transmission scheme of a MIMO system.

These steps can be implemented in a space/time decoding module 17 as illustrated in FIG. 1.

More specifically, after reception of the signal Y at the different receiving antennas, a decoding technique representing a space/time encoding applied in transmission is selected 21 (this decoding technique is also called a space/time decoding technique) from among at least two techniques available in the receiver. This selection step 21 takes account of at least one selection criterion.

Then, the received signal Y is decoded 22 by applying the decoding technique selected during the selection step 21. The signal equalized at output of the space/time decoding module is then fed into a demodulation module.

It can be noted that the method of an embodiment of the invention can be applied in many ways, especially in hardware form or in software form.

In particular, the receiver can contain a sequential decoder comprising a variable bias. Indeed, such a decoder can be used to attain optimum or sub-optimum performance by a simple adjustment of the bias. Thus, a receiver applying the decoding method according to an embodiment of the invention is not necessarily more complex structurally than a classic receiver since it is possible, using hardware resources of a single decoder, to obtain an optimal decoding technique and a sub-optimal decoding technique by modifying the value of the bias.

Here below, various selection criteria that can be taken into consideration for selecting a decoding technique are described. Naturally, these examples are not restrictive and other selection criteria could be proposed.

2. First Selection Criterion

We consider for example a first selection criterion taking account of the quality of the transmission channel and variations of the channel during transmission.

It may be recalled first of all that Shannon's work in 1948 on information theory ("*Mathematical Theory of Communication*") can be used to deduce the limits of a transmission system. In particular, one major parameter is the capacity of the channel. This value is used to determine the quantity of information that can be transmitted in the channel without error.

For example, for a fast-fading MIMO channel, the ergodic capacity corresponding to the maximum mutual information (as defined in Talatar E., "*Capacity of Multi-Antenna Gaussian channels*", International Technical Report, Bell Laboratories, 1995), can be written as follows:

$$C = E_H\left\{\log_2\left(\det\left(I_{n_r} + \frac{\rho}{n_t}HH^T\right)\right)\right\}$$

with:

H being the transfer matrix of the channel;
$n_t$ the number of sending antennas;
$n_r$ the number of receiving antennas; and
$\rho$ the signal-to-noise ratio per receiving antenna.

For a block-fading MIMO channel, the strict capacity as defined by Shannon is null. We therefore define an instantaneous capacity C(H) in the following form:

$$C(H) = E_H\left\{\log_2\left(\det\left(I_{n_r} + \frac{\rho}{n_t}HH^T\right)\right)\right\}$$

The probability of outage of the channel corresponds to the probability that the instantaneous capacity C(H) is lower than the transmission rate R expressed in bits, corresponding to the number of bits transmitted per channel use:

Pout(R)=Pr{C(H)<R}

In other words:

if C(H)<R: the transmission channel is of excessively poor quality and it is not possible to correctly decode the data transmitted;

if C(H)≧R: the transmission channel is of good quality and enables the correct decoding of the transmitted data.

According to this first embodiment of the invention, this outage probability is taken into account to select one decoding technique from among several decoding techniques available at the receiver.

More specifically, if C(H)<R, i.e. if this is an overflow situation, and it will not be possible to accurately decode the transmitted message, then the selected decoding technique is a sub-optimal technique such as ZF or ZF-DFE.

On the contrary, if C(H)≧R, i.e. if we are not in an overflow situation and the transmitted message can therefore be accurately decoded, then the selected decoding technique is an optimal technique as understood in terms of maximum likelihood, for example sphere decoding, a technique using the Schnorr-Euchner algorithm or a stack decoder with a bias b equal to 0.

In particular, it is possible that the transmission channel will vary during the communication, for example if the receiver is mobile.

It is then possible to select a new decoding technique which could be better adapted to the transmission channel. Indeed, the selection and decoding steps can be implemented adaptively according to one particular aspect of the invention, periodically and/or as a function of a variation of the transmission channel.

For example, if the transmission channel is of high quality, the selected decoding technique is optimal. It is for example a sequential decoding technique with a null bias (b=0). Then, if the quality of the channel gets deteriorated, the decoding technique can be changed by passing to a sub-optimal technique. For example to change a decoding technique, the bias is modified (b≠0). If the channel again becomes a high-quality channel, it is possible to return to an optimal decoding technique by again modifying the value of the bias (b=0).

FIGS. 3A to 3D illustrate especially the performance characteristics of an embodiment of the invention relatively to the prior-art solutions in a MIMO system using a 16-QAM amplitude modulation.

Figure 3A:
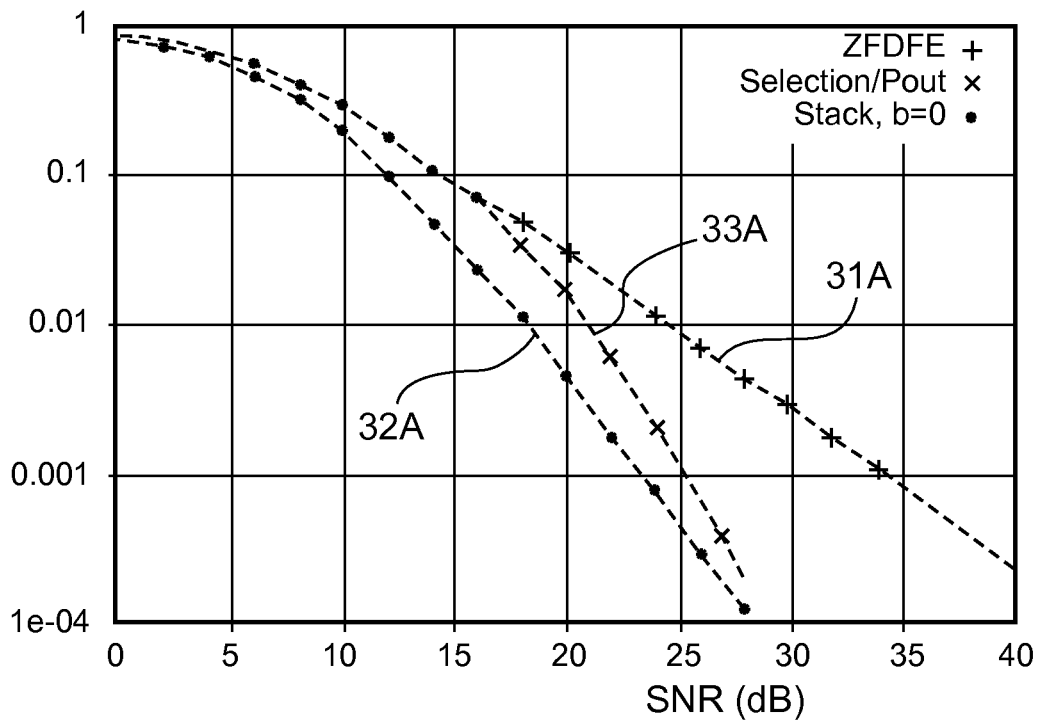
FIGS. 3A to 3D, 4A and 4B illustrate the performance characteristics of an embodiment of the invention relative to the prior-art solutions in a MIMO system applying two sending antennas and two receiving antennas.
Figure 3B:
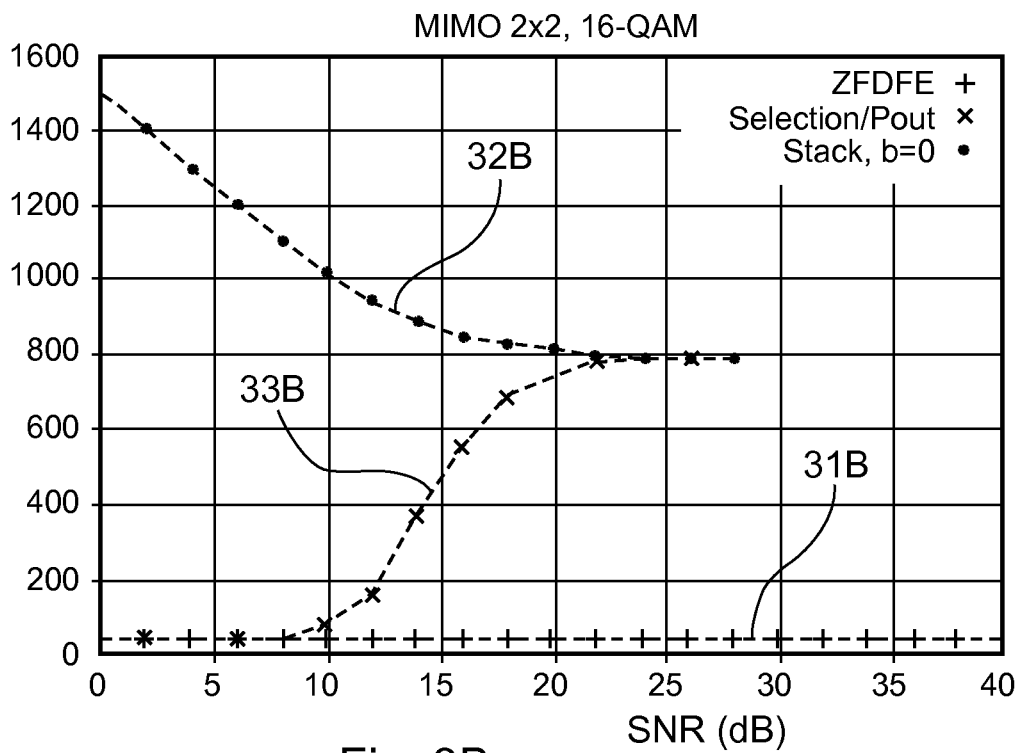

More specifically, FIGS. 3A and 3B respectively compare the error rate per word as a function of the signal-to-noise ratio (SNR) in dB, and the complexity in number of operations (number of multiplications) as a function of the signal-to-noise ratio (SNR) in dB, in a system implementing two sending antennas and two receiving antennas, and using:

a ZF-DFE type sub-optimal decoding technique $31_A$, $31_B$ according to the prior art;

an ML type optimal decoding technique $32_A$, $32_B$ according to the prior art;

the decoding technique of an embodiment of the invention applying a selection criterion that takes account of the outage probability $33_A$, $33_B$.

Figure 3C:
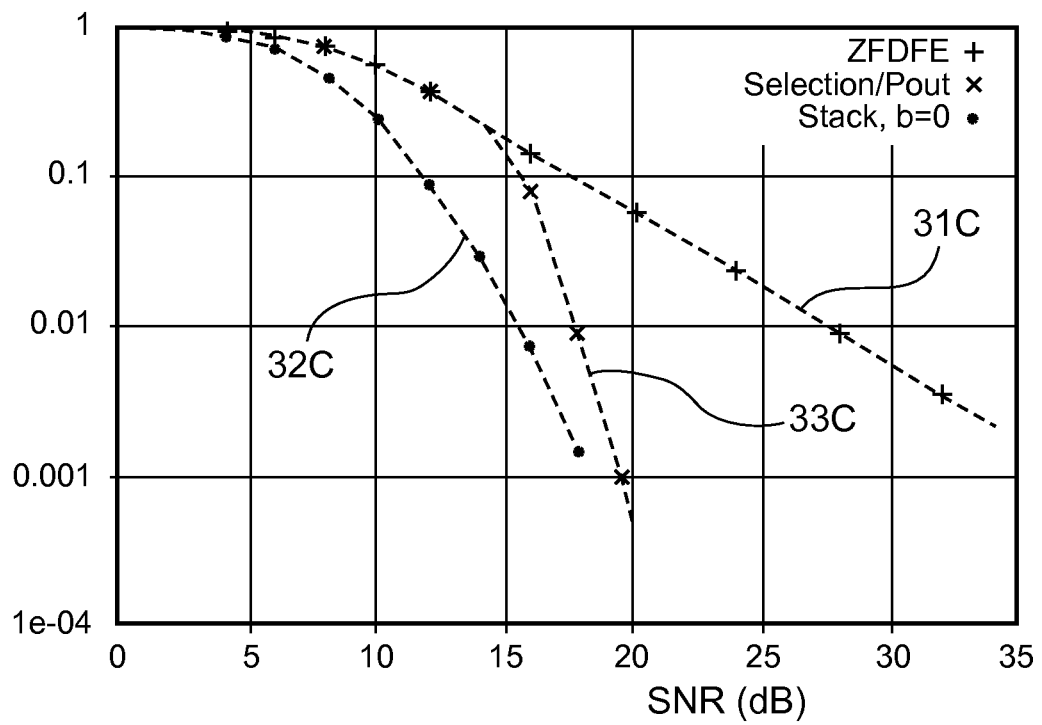
Figure 3D:
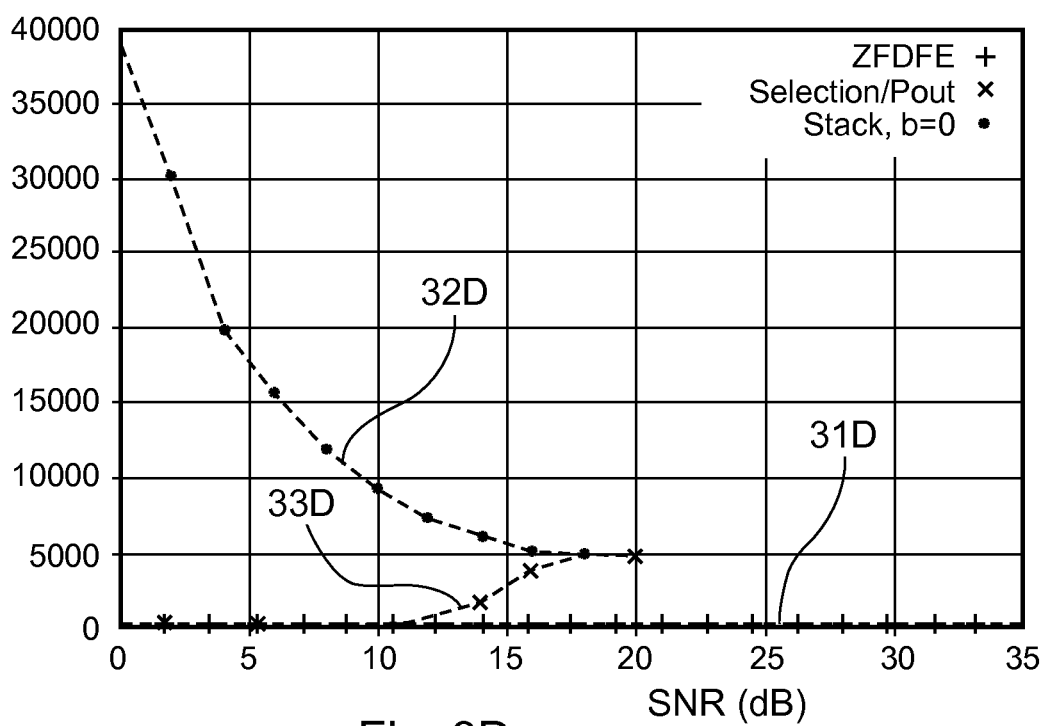

FIGS. 3C and 3D respectively compare the error rate per word as a function of the signal-to-noise ratio (SNR) in dB and the complexity in number of operations (multiplications) as a function of the signal-to-noise ratio (SNR) in dB, in a system implementing four sending antennas and four receiving antennas, and using:

a ZF-DFE type sub-optimal decoding technique $31_C$, $31_D$ according to the prior art;

an ML type optimal decoding technique $32_C$, $32_D$ according to the prior art;

the decoding technique of an embodiment of the invention applying a selection criterion that takes account of the outage probability $33_C$, $33_D$.

It can be noted in these performance curves that the first selection criterion based on the outage probability considerably reduces the complexity of decoding (in terms of number of multiplications) while preserving high performance (loss less than 2 dB in the error rate).

For example, the following table illustrates the rate of selection of a sub-optimal decoding technique (for example ZF-DFE) and an optimal decoding technique (for example ML) for different signal-to-noise ratios for transmission in a multi-antenna system implementing two sending and two receiving antennas, and using a 16-QAM modulation.

This table also illustrates the gain in complexity and the loss of performance in dB relative to the optimal techniques in terms of ML decoding.

It can be noted for example that, for a signal-to-noise ratio of 10 dB, the gain in complexity is close to 90% with a loss of less than 2 dB in error rate relative to the performance of a maximum likelihood decoder.

|  | SNR (dB) at the receiver level | | | | | |
| --- | --- | --- | --- | --- | --- | --- |
|  | 6 | 10 | 14 | 18 | 22 | 26 |
| ZF-DFE (%) | 100 | 95.52 | 56.70 | 13.44 | 1.58 | 0.001 |
| ML (%) | 0 | 4.48 | 43.3 | 85.56 | 98.42 | 99.99 |
| Mean gain (in percentage relative to ML decoding) | 96.68 | 92.73 | 59.02 | 16.53 | 2.35 | 0.16 |
| Mean loss (in dB) | 0.92 | 1.29 | 2.2 | 4.81 | 2.59 | 1.8 |

3. Second Selection Criterion

Henceforth, we consider a second selection criterion taking account of the specifications of the system.

More specifically, we consider a second embodiment of the invention according to which one decoding technique among several techniques available in the receiver is selected in taking account of one or more target error rates corresponding to one or more signal-to-noise ratios.

For example, it is possible to define a target error rate corresponding to a difference of 1 dB at most relative to the error rate obtained with a ML decoder.

We thus define a first range of signal-to-noise ratios $SNR^1$ (dB)=[0,12] for a target error rate $Pe_{target}^1$, a second signal-to-noise ratio $SNR^2$(dB)=[12,14] for a target error rate $Pe_{target}^2$, a third signal-to-noise ratio $SNR^3$(dB)=[14,16] for a target error rate $Pe_{target}^3$, etc, used to maintain a maximum difference of 1 dB compared with the performance of ML decoding.

The decoding technique selected during the selection step is the one used to comply with the performance aimed at, i.e. the one having an error rate below the target error rate for a given range of signal-to-noise ratios.

In particular, once a decoding technique used to attain these performance values is identified, it is not necessary to go through the other decoding techniques.

It is also possible to pre-select several decoding techniques for complying with the target error rate or rates.

In this case, the selection step can select the decoding technique having the lowest error rate or rates, or the least complex decoding technique among the different pre-selected decoding techniques.

Thus, the decoding technique selected according to this second selection criterion provides a compromise between performance characteristics (in terms of error rate) and complexity (in terms of mathematical operations) of the transmission system.

Figure 4A:
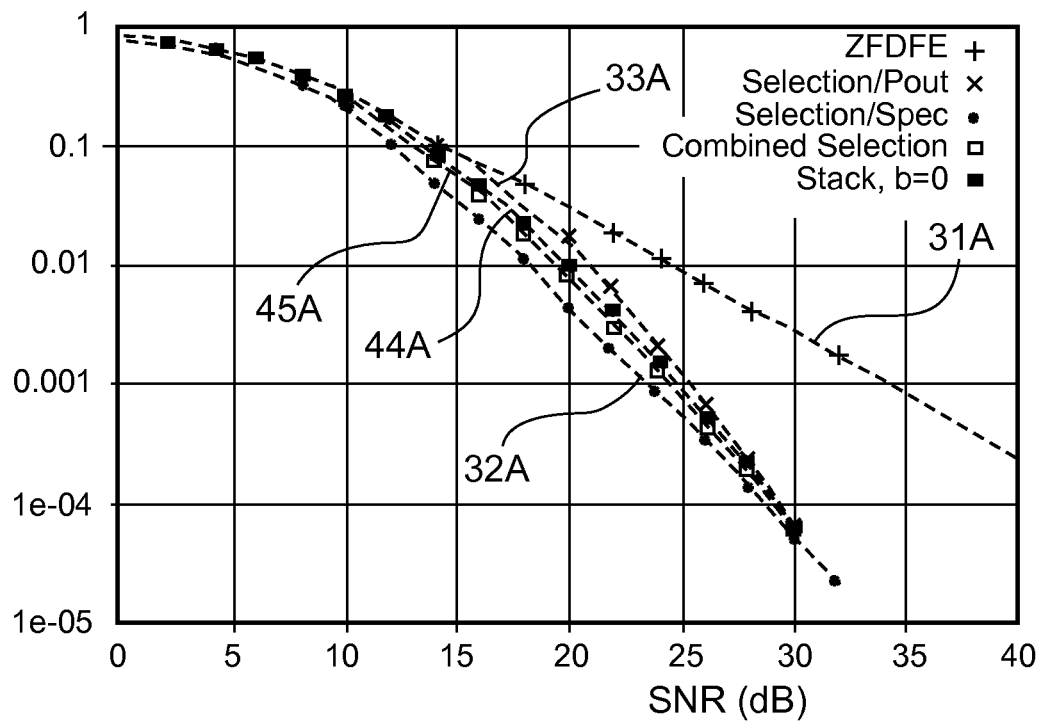
Figure 4B:
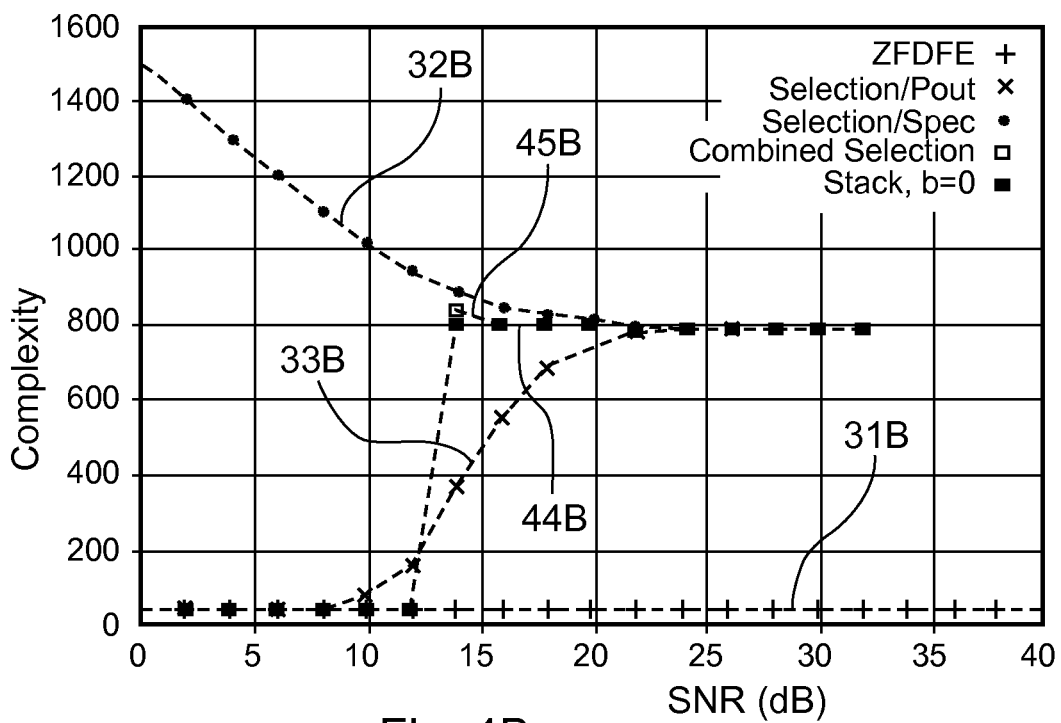

FIGS. 4A and 4B illustrate the performance characteristics of an embodiment of the invention as compared with to the prior-art solutions in a MIMO system implementing two sending antennas and two receiving antennas.

More specifically, FIG. 4A compares the error rate per word as a function of the signal-to-noise ratio (SNR) in dB for a 16-QAM amplitude modulation using:

the ZF-DFE type sub-optimal decoding technique $31_A$ according to the prior art;

the ML type optimal decoding technique $32_A$ according to the prior art;

the decoding technique of an embodiment of the invention applying a selection criterion that takes account of the outage probability $33_A$.

the decoding technique of an embodiment of the invention applying a selection criterion that takes account of one or more target error rates $44_A$.

FIG. 4B compares the complexity in number of operations (multiplications) as a function of the signal-to-noise ratio (SNR) in dB for a 16-QAM amplitude modulation using:

a ZF-DFE type sub-optimal decoding technique $31_B$ according to the prior art;

an ML type optimal decoding technique $32_B$ according to the prior art;

the decoding technique of an embodiment of the invention applying a selection criterion that takes account of the outage probability $33_B$;

the decoding technique of an embodiment of the invention applying a selection criterion that takes account of one or more target error rates $44_B$.

It can be seen in these performance curves that the second selection criterion based on the specifications of the transmission system (for example a target error rate) also considerably reduces the decoding complexity (in number of multiplications) while maintaining high performance.

Furthermore, the decoding technique selected according to this selection criterion taking account of the specifications of the system provides better performance than a decoding technique selected according to the selection criterion taking account of the conditions of transmission.

It makes it possible especially to choose an efficient compromise between the performance and complexity of the transmission system.

For example, the following table illustrates the decoding technique selected from among the ZF-DFE sub-optimal decoding technique and the variable bias sequential decoding technique, making it possible to comply with the constraint of a target error rate corresponding to a difference of 1 dB at most relatively to the error rate obtained with an ML decoder for different ranges of signal-to-noise ratios. In particular, it may be recalled that the variable bias sequential decoding makes it possible to obtain optimal performance with a bias b equal to 0 and sub-optimal performance with a bias b different from 0.

This table also illustrates the loss in performance in dB relative to the optimal ML techniques:

4. Third Selection Criterion

Finally, a third criterion is considered taking account of both the specifications of the system and the conditions of transmission, i.e. the outage probability.

More specifically, in this third embodiment, first of all the ranges of signal-to-noise ratios used to comply with a target error rate are defined.

Again, if a target error rate is chosen corresponding to a maximum difference of 1 dB relative to the error rate obtained with the ML decoder, it is possible to define the ranges $SNR^1$ (dB)=[0,12], $SNR^2$ (dB)=[12,14], $SNR^3$(dB)=[14,16], ..., $SNR^{12}$ (dB)=[32,∞].

Then, for each of these ranges, the selection criterion based on the outrage probability is applied.

We consider for example the range $SNR^1$(dB)=[0,12]:

if the instantaneous capacity of the transmission channel is below the transmission rate in bits in this range of signal-to-noise ratios, then there is a situation of overflow and a sub-optimal decoding technique is selected for this range;

if not, there is no situation of overflow and an optimal decoding technique is selected.

This operation is then reiterated for the different ranges.

We refer again to FIGS. 4A and 4B illustrating the performance of an embodiment of the invention relative to the prior-art solutions, in a MIMO system implementing two sending antennas and two receiving antennas.

More specifically, FIG. 4A compares the error rate per word as a function of the signal-to-noise ratio (SNR) in dB for a 16-QAM amplitude modulation using the decoding technique of an embodiment of the invention combining the two selection criteria $45_A$.

FIG. 4B compares the complexity in number of operations (multiplications) as a function of the signal-to-noise ratio (SNR) in dB for a 16-QAM amplitude modulation using the decoding technique according to an embodiment of the invention combining the two selection criterion $45_B$.

It can be seen in these performance curves that the third selection criterion based on the combination of the first two criteria also considerably reduces the complexity of decoding (in number of multiplications) while at the same time preserving high performance.

In particular, as compared with the selection criterion based on the outage probability only, this selection based on a combination of several selection criteria enables the selection of a different sub-optimal decoding technique depending on the signal-to-noise ratio (for example a ZF-DFE type technique if the signal-to-noise ratio is from 0 to 12 dB and a MMSE-DFE type technique if the signal-to-noise ratio is from 12 to 14 dB).

Furthermore, as compared with the selection criterion based on the specifications of the system only, this selection based on a combination of several selection criteria smoothens the performance curves in maintaining a loss of 1 dB at most relative to the performance obtained with an ML decoder.

Furthermore, the performance values in terms of error rate are improved since taking account of the outage probability eliminates situations in which the channel is of very poor quality (with failure of the decoding).

| | SNR (dB) at the receiver | | | | | | | | | | | |
|---|---|---|---|---|---|---|---|---|---|---|---|---|
| | [0-12] | [12-14] | [14-16] | [16-18] | [18-20] | [20-22] | [22-24] | [24-26] | [26-28] | [28-30] | [30-32] | ≧32 |
| Selected decoding technique | ZF-DFE | b = 1 | b = 0.5 | b = 0.3 | b = 0.15 | b = 0.08 | b = 0.05 | b = 0.04 | b = 0.02 | b = 0.015 | b = 0.005 | b = 0 |
| Mean loss (in dB) | 0.92 | 1 | 1.08 | 0.86 | 1 | 1 | 0.8 | 1 | 0.74 | 0.57 | 0 | 0 |

For example, the following table illustrates the decoding technique selected from among the ZF-DFE sub-optimal decoding technique and the variable bias sequential decoding technique enabling compliance with the constraint of a target error rate corresponding to a maximum difference of 1 dB relative to the error rate obtained with an ML decoder for different ranges of signal-to-noise ratios, and taking account of the outage probability within each of these ranges.

This table also illustrates the outage probability Pout of the channel in percentage:

| | SNR (dB) at the receiver | | | | | | | | | | | |
|---|---|---|---|---|---|---|---|---|---|---|---|---|
| | [0-12] | [12-14] | [14-16] | [16-18] | [18-20] | [20-22] | [22-24] | [24-26] | [26-28] | [28-30] | [30-32] | ≧32 |
| Selected decoding technique | ZF-DFE | b = 1 | b = 0.5 | b = 0.3 | b = 0.15 | b = 0.08 | b = 0.05 | b = 0.04 | b = 0.02 | b = 0.015 | B = 0.005 | b = 0 |
| Pout (in %) | 97 | 82 | 62 | 13 | 5 | 1 | ≦1 | ≦1 | ≦1 | ≦1 | ≦1 | ≦1 |

5. Increase in Number of Antennas

The figures presented thus show sharp improvement in performance and/or complexity of the multi-antenna system comprising two sending antennas and two receiving antennas through the use of the technique according to an embodiment of the invention.

In particular, the proposed solution is particularly valuable when the number of antennas increases, since it considerably reduces the complexity of the transmission system while showing very high performance.

6. Structure of the Decoding Device

Figure 5:
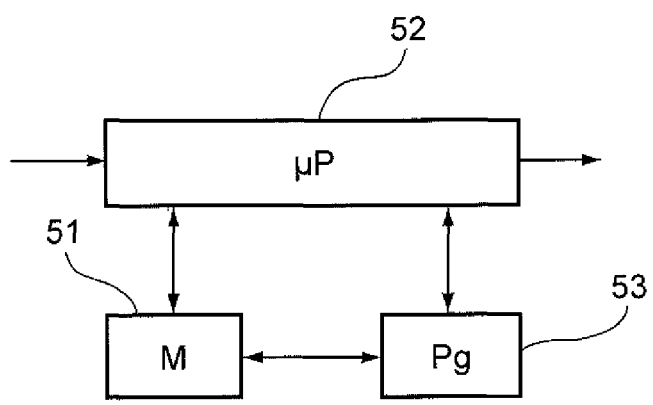
FIG. 5 presents the structure of a decoding device applying the decoding method of an embodiment of the invention.

Finally, referring to FIG. 5, we present the simplified structure of a decoding device implementing a decoding technique according to an embodiment of the invention.

Such a decoding device, integrated for example into the receiver, comprises a memory 51 constituted by a buffer memory, a processing unit 52 equipped for example with a microprocessor μP and driven by the computer software program 53, applying the decoding method according to an embodiment of the invention.

At initialization, the code instructions of the computer software program 53 are loaded for example into a RAM and then executed by the processor of the processing unit 52. At input, the processing unit 52 receives the received signal Y on the different receiving antennas. The microprocessor of the processing unit 52 implements the steps of the decoding method described here above according to the instructions of the computer software program 53 to decide on the best suited decoding technique. To this end, the decoding device comprises, in addition to the buffer memory 51, means for selecting a decoding technique representative of a space/time encoding implementing at sending side and means for decoding the signal that implement the selected decoding technique. These means are driven by the microprocessor of the processor unit 62.

The processing means 52 therefore deliver an equalized signal.

Although the present disclosure has been described with reference to one or more examples, workers skilled in the art will recognize that changes may be made in form and detail without departing from the scope of the disclosure and/or the appended claims.

The invention claimed is:

1. A method for decoding a signal sent by a sender through a transmission channel and received by a receiver comprising at least one receiving antenna, the method comprising:

selecting, among at least two decoding techniques available in said receiver, a decoding technique that is representative of a space/time encoding implemented at sending, taking account of at least one selection criterion, wherein at least one of said selection criterion takes account of an outage probability of the transmission channel, and wherein selecting selects a sub-optimal decoding technique when an instantaneous capacity of said transmission channel is lower than a transmission rate, in terms of bits per channel use, and selects an optimal decoding technique in terms of maximum likelihood (ML) when the instantaneous capacity of the transmission channel is greater than or equal to the transmission rate, in terms of bits per channel use; and decoding said signal implementing the selected decoding technique, wherein selecting and decoding are implemented adaptively, as a function of a variation of the transmission channel.

2. The method for decoding according to claim 1, wherein at least one selection criterion takes account of at least one target error rate as a function of a signal-to-noise ratio.

3. The method for decoding according to claim 2, wherein selecting pre-selects one or more decoding techniques complying with a target error rate.

4. The method for decoding according to claim 3, wherein selecting selects the decoding technique having the lowest error rate among the pre-selected decoding techniques.

5. The method for decoding according to claim 1, wherein the method applies a first selection criterion taking account of at least one target error rate as a function of a signal-to-noise ratio so as to define at least two ranges of signal-to-noise ratios and, for each of said ranges, a second criterion of selection taking account of an outage probability of said transmission channel in said range.

6. The method for decoding according to claim 1, wherein the decoding techniques belong to a group comprising:
   a "Zero-Forcing" (ZF) linear decoding technique;
   a "Minimum Mean Square Error" (MMSE) linear decoding technique;
   a "Zero-Forcing—Decision Feedback Equalization" (ZF-DFE) decoding technique;
   a "Minimum Mean Square Error—Decision Feedback Equalization" (MMSE-DFE) decoding technique;
   a sphere decoding technique;
   a decoding technique based on the Schnorr-Euchner algorithm;
   a Fano sequential decoding technique;
   a sequential stack decoding technique;
   a sequential decoding technique with a bias.

7. A non-transitory computer-readable carrier comprising a computer software product recorded thereon, wherein the product comprises program code instructions for implementing a method for decoding a signal sent by a sender through a transmission channel and received by a receiver comprising at least one receiving antenna, when the instructions are executed on a computer, wherein the method comprises:

selecting, among at least two decoding techniques available in said receiver, a decoding technique that is representative of a space/time encoding implemented at sending, taking account of at least one selection criterion, wherein at least one of said selection criterion takes account of an outage probability of the transmission channel, and wherein selecting selects a sub-optimal decoding technique when an instantaneous capacity of said transmission channel is lower than a transmission rate, in terms of bits per channel use, and selects an optimal decoding technique in terms of maximum likelihood (ML) when the instantaneous capacity of the transmission channel is greater than or equal to the transmission rate, in terms of bits per channel use; and decoding said signal implementing the selected decoding technique, wherein selecting and decoding are implemented adaptively, as a function of a variation of the transmission channel.

8. A device for decoding a signal sent by a sender through a transmission channel and received by a receiver comprising at least one receiving antenna, wherein the device comprises:

means for selecting, among at least two decoding techniques available in said receiver, a decoding technique that is representative of a space/time encoding implemented at sending, said means for selecting comprising means for taking account of at least one selection criterion, wherein at least one of said selection criterion takes account of an outage probability of the transmission channel, and wherein selecting selects a sub-optimal decoding technique when an instantaneous capacity of said transmission channel is lower than a transmission rate, in terms of bits per channel use, and selects an optimal decoding technique in terms of maximum likelihood (ML) when the instantaneous capacity of the transmission channel is greater than or equal to the transmission rate, in terms of bits per channel use;

means for decoding said signal comprising means for implementing the selected decoding technique; and means for implementing said means for selecting and means for decoding adaptively, as a function of a variation of said transmission channel.

9. A method for decoding a signal sent by a sender through a transmission channel and received by a receiver comprising at least one receiving antenna, the method comprising:

selecting, among at least two decoding techniques available in said receiver, a technique of decoding that is representative of a space/time encoding implemented at sending, taking account of at least one selection criterion, wherein the method applies a first selection criterion taking account of at least one target error rate as a function of a signal-to-noise ratio so as to define at least two ranges of signal-to-noise ratios and, for each of said ranges, a second criterion of selection taking account of an outage probability of said transmission channel in said range; and decoding said signal implementing the selected decoding technique, wherein selecting and decoding are implemented adaptively, as a function of a variation of the transmission channel.

* * * * *

UNITED STATES PATENT AND TRADEMARK OFFICE
CERTIFICATE OF CORRECTION

PATENT NO.        : 8,422,598 B2
APPLICATION NO.   : 12/866183
DATED             : April 16, 2013
INVENTOR(S)       : Othman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 185 days.

Signed and Sealed this
Eighth Day of September, 2015

Michelle K. Lee
*Director of the United States Patent and Trademark Office*